United States Patent
Yuk et al.

(10) Patent No.: US 8,953,525 B2
(45) Date of Patent: Feb. 10, 2015

(54) METHOD AND APPARATUS FOR PERFORMING UPLINK RANGING IN A WIRELESS ACCESS SYSTEM

(75) Inventors: Young-soo Yuk, Anyang-si (KR); Jin Lee, Anyang-si (KR); Giwon Park, Anyang-si (KR); Inuk Jung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 185 days.

(21) Appl. No.: 13/698,030

(22) PCT Filed: May 18, 2011

(86) PCT No.: PCT/KR2011/003687
§ 371 (c)(1),
(2), (4) Date: Nov. 14, 2012

(87) PCT Pub. No.: WO2011/145887
PCT Pub. Date: Nov. 24, 2011

(65) Prior Publication Data
US 2013/0058284 A1 Mar. 7, 2013

Related U.S. Application Data

(60) Provisional application No. 61/345,609, filed on May 18, 2010.

(51) Int. Cl.
*H04W 48/08* (2009.01)
*H04W 48/18* (2009.01)

(52) U.S. Cl.
CPC .............. *H04W 48/08* (2013.01); *H04W 48/18* (2013.01)
USPC ........................................ 370/328; 370/395.2

(58) Field of Classification Search
CPC ... H04L 5/0053; H04L 5/001; H04W 72/042; H04W 60/02; H04W 60/06; H04W 48/08; H04W 48/18
USPC .............. 370/310, 328, 338, 351, 389, 395.1, 370/395.2; 455/403, 422.1, 435.1, 458
See application file for complete search history.

(56) References Cited

U.S. PATENT DOCUMENTS

| | | | |
|---|---|---|---|
| 6,463,307 B1 * | 10/2002 | Larsson et al. | 455/574 |
| 2005/0041573 A1 * | 2/2005 | Eom et al. | 370/208 |
| 2005/0128990 A1 * | 6/2005 | Eom et al. | 370/338 |
| 2006/0025134 A1 * | 2/2006 | Cho et al. | 455/435.1 |
| 2006/0189318 A1 * | 8/2006 | Kang et al. | 455/436 |

(Continued)

FOREIGN PATENT DOCUMENTS

| | | |
|---|---|---|
| KR | 10-2009-0100478 | 9/2009 |
| KR | 10-2010-0005669 | 1/2010 |

*Primary Examiner* — Obaidul Huq
(74) *Attorney, Agent, or Firm* — McKenna Long & Aldridge LLP

(57) ABSTRACT

The present description relates to a method in which a terminal in an idle mode performs network reentry in a wireless access system, wherein the method comprises: a step of receiving, from a base station, control information containing a first parameter and a second parameter for determining a frame in which uplink ranging is to be performed; and a step of performing uplink ranging for network reentry with the base station on the basis of the control information, wherein the first parameter indicates the location of a superframe in which uplink ranging is to be performed, and the second parameter indicates the frame duration in the superframe which is indicated by the first parameter and in which uplink ranging is performed.

22 Claims, 13 Drawing Sheets

(56) References Cited

U.S. PATENT DOCUMENTS

| | | |
|---|---|---|
| 2007/0087767 A1* | 4/2007 | Pareek et al. ............... 455/502 |
| 2007/0258407 A1* | 11/2007 | Li et al. ..................... 370/331 |
| 2008/0153491 A1* | 6/2008 | Cho et al. ................. 455/435.1 |
| 2008/0253569 A1* | 10/2008 | Lim et al. .................. 380/258 |
| 2008/0298315 A1* | 12/2008 | Ihm et al. .................. 370/329 |
| 2009/0046675 A1* | 2/2009 | Pratt et al. ................. 370/337 |
| 2009/0274120 A1* | 11/2009 | Chou ........................ 370/331 |
| 2010/0240420 A1* | 9/2010 | Chin et al. ................ 455/574 |

* cited by examiner

METHOD AND APPARATUS FOR PERFORMING UPLINK RANGING IN A WIRELESS ACCESS SYSTEM

This Application is a 35 U.S.C. §371 National Stage Entry of International Application No. PCT/KR2011/003687, filed May 18, 2011 and claims the benefit of U.S. Provisional Application No. 61/345,609, filed May 18, 2010, all of which are incorporated by reference in their entirety herein.

BACKGROUND OF THE INVENTION

1. Field of the Invention

This specification relates to a wireless access system and, more specifically, to a method and apparatus for performing uplink ranging in idle mode for network reentry.

2. Related Art

M2M Communication, Machine Type Communication (MTC)

M2M communication is described in brief below.

Machine to machine (M2M) communication as it is means communication between electronic devices. That is, M2M communication means communication between things. In general, M2M communication means wired or wireless communication between electronic devices or communication between a device and a machine which are controlled by human beings, but M2M communication is used to specially denote wireless communication between an electronic device and an electronic device, that is, devices. Furthermore, M2M devices used in a cellular network have lower performance or capability than common terminals.

There are many terminals within a cell, and the terminals may be classified depending on the type, class, service type, etc of the terminal. In particular, when machine to machine (M2M) communication (or machine type communication (MTC)) is taken into consideration, the total number of terminals will increase suddenly. M2M devices may have the following features depending on supported service.

1. A large number of terminals within a cell
2. A small amount of data
3. Low transmission frequency (may have periodicity)
4. A limited number of data characteristics
5. Not sensitive to time delay
6. Low mobility or fixed In the case of a network reentry process in idle mode in an IEEE 802.16m system, a terminal in idle mode checks a paging message transmitted by a base station in the paging listening interval of its own paging cycle. If it is checked that the paging message is transferred thereto, the terminal in idle mode shifts to normal mode by randomly performing network reentry into the base station.

If numerous M2M devices in idle mode receive paging from a base station and perform network reentry into the base station at the same time, however, there is a high probability that a collision may occur because there are numerous M2M devices in an M2M (or MTC) environment.

SUMMARY OF THE INVENTION

An object of this specification is to provide a method and apparatus for performing uplink ranging, which reduce a collision when a terminal in idle mode performs uplink ranging in order to shift to normal mode by transmitting information on an area in which the terminal performs the uplink ranging in order to perform network reentry.

In this specification, a method in which a mobile station in idle mode performs network reentry in a wireless access system includes receiving control information, including a first parameter and a second parameter for determining a frame in which uplink ranging is performed, from a base station; and performing the uplink ranging for network reentry into the base station based on the control information, wherein the first parameter indicates the position of a superframe in which the uplink ranging is performed, and the second parameter indicates a frame interval in which the uplink ranging is performed in the superframe indicated by the first parameter.

Furthermore, performing the uplink ranging may include determining any one frame in the frame interval, indicated by the second parameter, as a frame in which the uplink ranging is performed and transmitting an uplink ranging sequence to the base station through the determined frame.

Furthermore, the method may further include receiving a station identifier (STID) allocated by the base station.

Furthermore, the any one frame may be determined through a modulo operation of the STID and the second parameter.

Furthermore, the STID may be an STID allocated to a Machine to Machine (M2M) device.

Furthermore, the STID may be allocated through an initial access procedure with the base station.

Furthermore, the STID may be a deregistration identifier (DID).

Furthermore, the method may further include shifting to idle mode and receiving a paging message from a base station in a paging interval, after shifting to the idle mode.

Furthermore, the first parameter may be an offset value between a superframe in which the paging message is received and the superframe in which the uplink ranging is performed.

Furthermore, the control information may be received through an initial network entry process with the base station.

Furthermore, the control information may be included in a ranging response (RNG-RSP) message, a subscriber station basic capability response (SBC-RSP) message, or a registration response (REG-RSP) message and received.

Furthermore, the control information may be received while shifting to the idle mode.

Furthermore, the control information may be included in a deregistration response (DREG-RSP) message and received.

Furthermore, the control information may be included in the paging message and received.

Furthermore, in this specification, a mobile station for performing network reentry in idle mode in a wireless access system includes a radio frequency (RF) unit for transmitting and receiving radio signals to and from an outside; and a control unit connected to the RF unit, wherein the control unit controls the RF unit so that the RF unit receives control information, including a first parameter indicative of the position of a superframe in which uplink ranging is performed and a second parameter indicative of a frame interval in which the uplink ranging is performed in the superframe indicated by the first parameter, from a base station and performs the uplink ranging for network reentry into the base station based on the control information.

Furthermore, the control unit may control the RF unit so that the RF unit receives a paging message from a base station in a paging interval after shifting to idle mode.

Furthermore, the first parameter may be an offset value between a superframe in which the paging message is received and the superframe in which the uplink ranging is performed.

Furthermore, the control unit may determine any one frame in the frame interval, indicated by the second parameter, as a frame in which the uplink ranging is performed and performs control so that the uplink ranging for the base station is performed through the determined frame.

Furthermore, the control unit may perform control so that a station identifier (STID) allocated by the base station is received.

Furthermore, the control unit may perform control so that the any one frame is determined by performing a modulo operation of the STID and the second parameter.

Furthermore, the control unit may control the RF unit so that the RF unit receives the control information through an initial network entry process with the base station.

Furthermore, the control unit may control the RF unit so that the RF unit receives the control information in a step of shifting to the idle mode.

In this specification, areas where terminals in idle mode perform uplink ranging are distributed by transmitting information on the areas where the terminals perform the uplink ranging for network reentry. Accordingly, there is an advantage in that a collision that may occur when terminals in idle mode perform uplink ranging in order to shift to normal mode can be reduced.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or evolved UTRA (E-UTRA). IEEE 802.16m is the evolution of IEEE 802.16e, and it provides a backward compatibility with an IEEE 802.16e-based system.

UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

In order to clarify a description, IEEE 802.16m is chiefly described, but the technical spirit of the present invention is not limited thereto.

Figure 1:
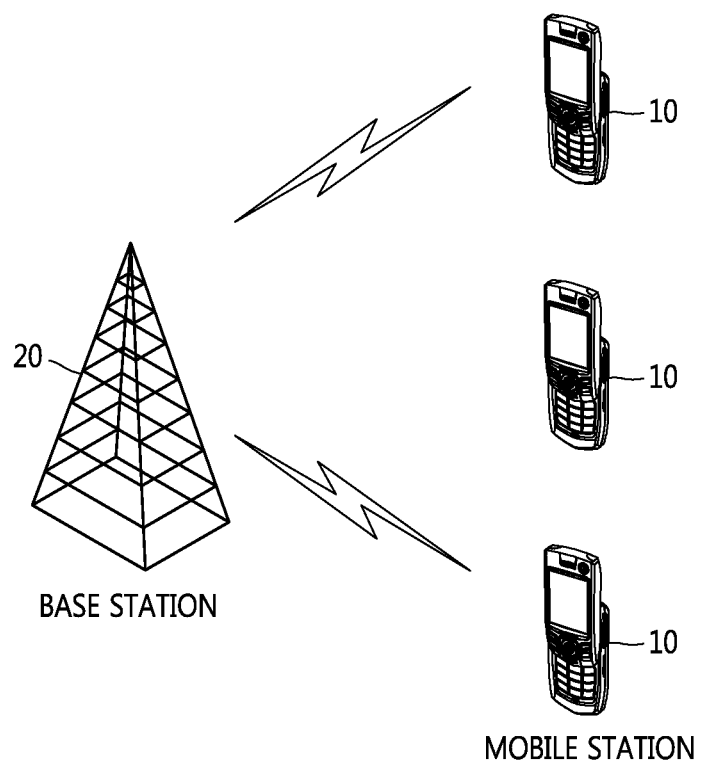
FIG. 1 is a block diagram showing a wireless communication system in accordance with an embodiment of this specification.

FIG. 1 is a block diagram showing a wireless communication system in accordance with an embodiment of this specification.

The wireless communication systems are widely deployed in order to provide a variety of communication services, such as voice and packet data.

Referring to FIG. 1, the wireless communication system includes mobile stations (MSs) 10 and a base station (BS) 20. The MS 10 may be fixed or mobile and also be called another terminology, such as user equipment (UE), a user terminal (UT), a subscriber station (SS), a wireless device, or an advanced mobile station (AMS).

Furthermore, the MS 10 may be an M2M (M2M) MS which supports MTC.

The BS 20 basically refers to a fixed station that communicates with the MSs 10, and the BS 20 may also be called another terminology, such as a NodeB, a base transceiver system (BTS), or an access point. One or more cells may be present in one BS 20.

The wireless communication system may be a system based on orthogonal frequency division multiplexing (OFDM)/orthogonal frequency division multiple access (OFDMA).

OFDM uses a plurality of orthogonal subcarriers. OFDM uses an orthogonal characteristic between inverse fast Fourier transform (IFFT) and fast Fourier transform (FFT). A transmitter performs IFFT on data and sends the data. A receiver restores original data by performing FFT on a reception signal. A transmitter uses IFFT in order to combine multiple subcarriers, and a receiver uses corresponding FFT in order to separate multiple subcarriers.

Furthermore, a slot is a minimum data allocation unit and is defined by the time and a subchannel. In uplink, a subchannel may be constructed of a plurality of tiles. A subchannel is constructed of 6 tiles. In uplink, one burst may be constructed of 3 OFDM symbols and 1 subchannel.

In partial usage of subchannels (PUSC) permutation, each tile may include 4 contiguous subcarriers on 3 OFDM symbols. Alternatively, each tile may include 3 contiguous subcarriers on 3 OFDM symbols. A bin includes 9 contiguous subcarriers on an OFDM symbol. A band refers to a group of 4 rows of bins, and an adaptive modulation and coding (AMC) subchannel is constructed of 6 contiguous bins in the same band.

Figure 2:
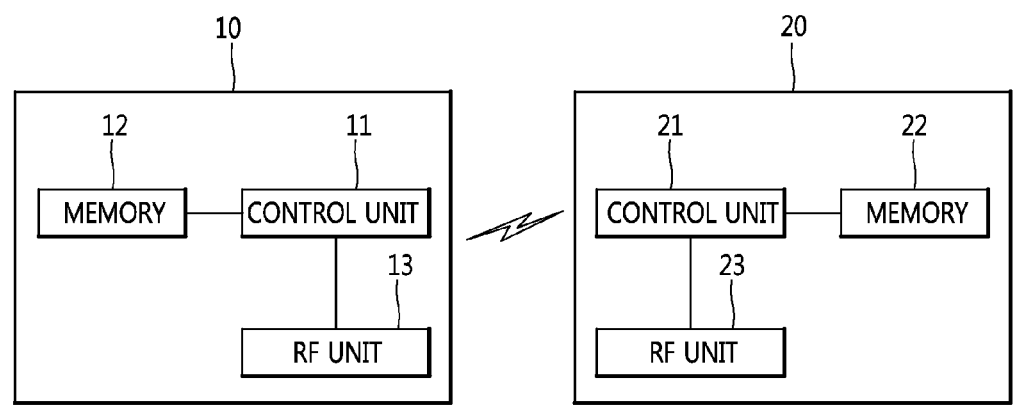
FIG. 2 shows an internal block diagram of an MS and a BS in a wireless access system in accordance with an embodiment of this specification.

FIG. 2 shows an internal block diagram of an MS and a BS in a wireless access system in accordance with an embodiment of this specification.

The MS 10 includes a control unit 11, memory 12, and a radio frequency (RF) unit 13.

The MS further includes a display unit, a user interface unit, etc.

The control unit 11 implements proposed functions, processes and/or methods. The layers of a wireless interface protocol may be implemented by the control unit 11.

The memory 12 is connected to the control unit 11, and the memory 12 stores protocols or parameters for performing wireless communication. That is, the memory 12 stores an MS driving system, applications, and common files.

The RF unit 13 is connected to the control unit 11, and the RF unit 13 transmits and/receives radio signals.

Additionally, the display unit displays various pieces of information on the MS, and well-known elements, such as a liquid crystal display (LCD) or organic light emitting diodes (OLED), may be used as the display unit. The user interface unit may be formed of a combination of well-known user interfaces, such as a keypad or a touch screen.

The BS 20 includes a control unit 21, memory 22, and an RF unit 23.

The control unit 21 implements proposed functions, processes and/or methods.

The layers of a wireless interface protocol may be implemented by the control unit 21.

The memory 22 is connected to the control unit 21, and the memory 22 stores protocols or parameters for performing wireless communication.

The RF unit 23 is connected to the control unit 21, and the RF unit 23 transmits and/receives radio signals.

The control unit 11, 21 may include application-specific integrated circuits (ASICs), other chipsets, logic circuits and/or data processors. The memory 12, 22 may include read-only memory (ROM), random access memory (RAM), flash memory, memory cards, storage media and/or other storage devices. The RF unit 13, 23 may include a baseband circuit for processing a radio signal. When an embodiment is implemented in software, the above-described scheme may be implemented using a module (process or function) that performs the above function. The module may be stored in the memory 12, 22 and executed by the control unit 11, 21.

The memory 12, 22 may be placed inside or outside the control unit 11, 21 and connected to the control unit 11, 21 using a variety of well-known means.

Figure 3:
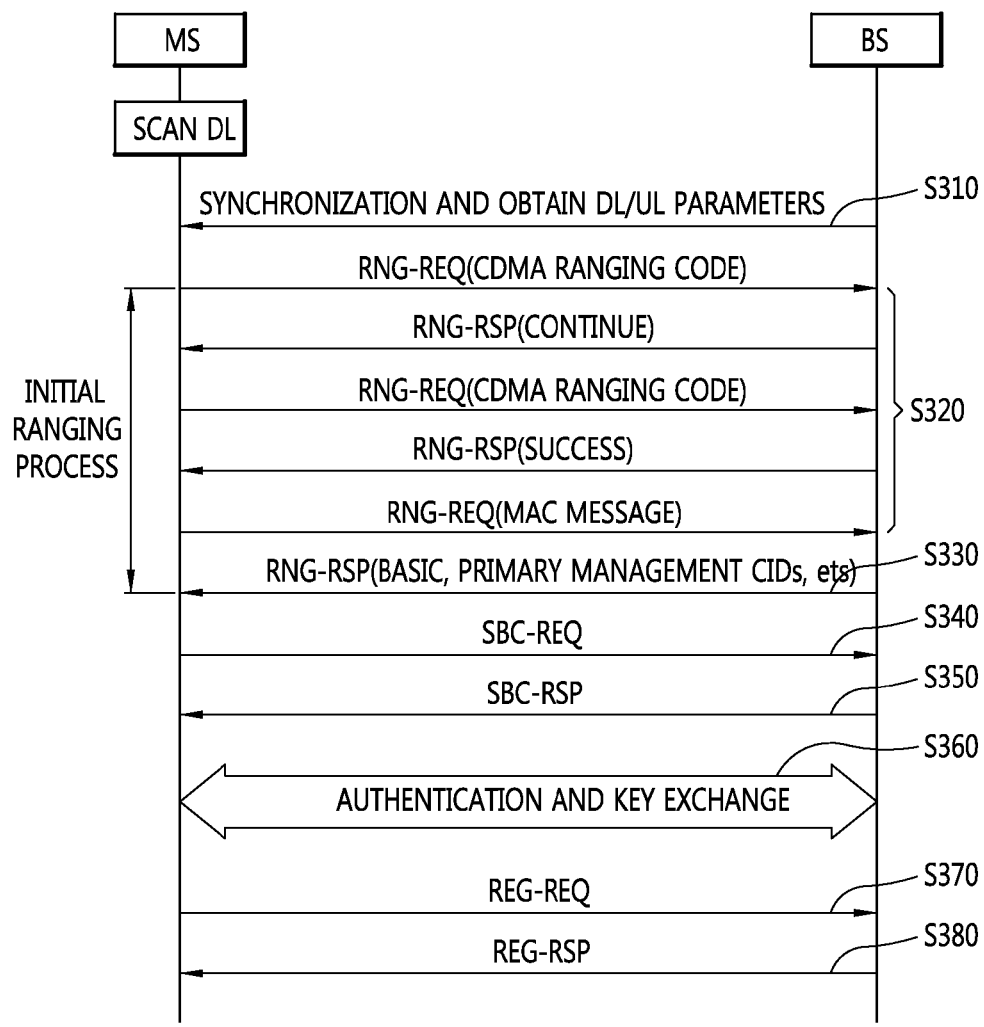
FIG. 3 is a flowchart illustrating an initial access method in a wireless communication system.

FIG. 3 is a flowchart illustrating an initial access method in a wireless communication system.

Referring to FIG. 3, when an MS 10 is powered on, the MS 10 first searches for an accessible BS by scanning downlink channels in order to perform initial access. Here, the MS scans the frequencies of a neighbor BS one by one because it does not have information on a network geography or configuration initially.

Furthermore, the MS 10 obtains system information on downlink and uplink from a retrieved BS 20, finishes all system configurations (S310), and then performs a ranging procedure with the retrieved BS (S320) as shown in FIG. 3.

Here, the step S320 refers to steps from a step in which the MS sends a ranging code for a ranging request to the BS to a step (S330) in which the MS receives a ranging response message from the BS, in the initial ranging process, as shown in FIG. 3.

The step S320 is described in more detail. The MS performs synchronization for uplink by performing ranging with the BS using a contention-based method of selecting a specific CDMA ranging code and sending the code to the BS.

The BS informs the MS of parameter values to be corrected by the MS through a ranging response (RNG-RSP) message until the synchronization is fully completed. While the parameter values are corrected, the RNG-RSP message is set to a status "continue". After the parameter values are corrected, the BS sends the RNG-RSP message having a status "success".

Here, the RNG-RSP message transmitted from the BS 20 to the MS 10 includes pieces of information on the power offset, timing offset, and data transmission/reception frequency offset of the MS which have been calculated by the BS based on the ranging request code received from the MS. The MS performs subsequent data transmission to the BS based on the pieces of information.

After it is checked that the ranging request based on the ranging code has been successfully performed by the RNG-RSP message, the MS sends a ranging request (hereinafter referred to as an RNG-REQ) message to the BS. The BS sends the corresponding RNG-RSP message to the MS (S330).

The MS that has received the RNG-RSP message from the BS sends a subscriber station basic capability request (hereinafter referred to as an SBC-REQ) message, including a variety of parameters and information on a certification method supportable by the MS, to the BS for the purpose of data transmission/reception to/from the BS (S340).

The BS that has received the SBC-REQ message from the MS compares the parameters and certification method, included in the SBC-REQ message and supported by the MS, with parameters and certification method supported by the BS. As a result of the comparison, the BS determines parameters and a certification method to be used by the MS for data transmission/reception to/from the BS and sends a subscriber station basic capability response (hereinafter referred to as an SBC-RSP) message, including the parameters and certification method, to the MS (S350).

The MS completes the execution of the basic capability negotiation with the BS and then performs an authentication procedure with the BS. That is, the MS and the BS authenticate each other and exchange authorization keys (S360).

Next, the MS performs a BS registration procedure by exchanging a registration request (REG-REQ) message and a registration response (REG-RSP) message with the BS (S370, S380).

After the registration of the MS and the BS is performed, IP connectivity is set up, time of day is set up, and other operation parameters are transmitted. Thus, connection between the MS and the BS is set up.

Terms used in an M2M system are summarized in brief below.

(1) Machine-to-Machine (M2M) communication: refers to the exchange of pieces of information which may be performed without the participation of a human being between user devices through a BS or between a server and devices within a core network through a BS.

(2) M2M ASN: refers to an access service network which can support M2M service.

(3) M2M device: refers to an MS having (or supporting) an M2M function.

(4) M2M subscriber: refers to the consumer of M2M service.

(5) M2M server: refers to an entity which can communicate with an M2M device. An M2M server provides an interface accessible to an M2M subscriber.

(6) M2M feature: refer to a feature unique to an M2M application that is supported by an M2M ASN. One or more features may be necessary to support an application.

(7) M2M group: refers to a group of M2M devices which include common and/or the same M2M subscriber, that is, share one or more features.

Definition of an M2M Group ID (MGID) and M2M Device (or device) ID (MDID)

In a system supporting M2M communication, a first identifier indicative of an M2M group to which M2M devices belong and second identifiers for distinguishing the M2M devices, belonging to the M2M group, from one another are assigned to the M2M devices.

Here, the first identifier refers to an identifier used to distinguish M2M groups from one another within a cell, and the second identifier refers to an identifier used to distinguish M2M devices from one another in a group to which the M2M devices belong. That is, the first identifier may be represented by an M2M group ID, and the second identifier may be represented by an M2M device ID.

Furthermore, the first identifier may be used as a primary M2M device ID, and the second identifier may be used as a secondary M2M device ID.

Hereinafter, the first identifier is used as an M2M group ID, and the second identifier is used as an M2M device ID, for convenience' sake.

That is, an M2M communication support system allocates an M2M group ID and an M2M device ID to be used in communication between a BS to M2M devices to the M2M devices when the M2M devices perform initial network entry. Here, the M2M communication support system refers to a network entity that is connected to a BS or a network, and the network entity may be an M2M server, for example.

Although an 802.16 (in particular, 16m) system is described as an example, it is evident that the methods proposed in this specification are not limited to only the 802.16m system, but may be used in systems, such as LTE and LTE-A.

A method in which an MS in idle mode performs uplink ranging for network reentry, proposed by this specification, is described in detail below.

Figure 4:
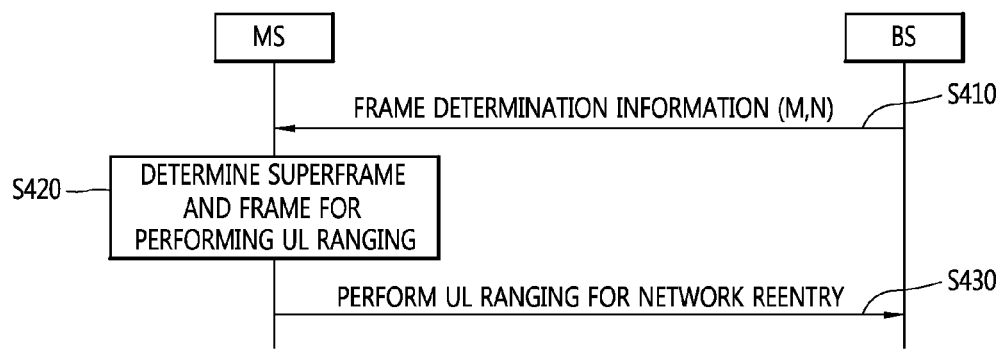
FIG. 4 is a flowchart illustrating a method of performing uplink ranging in accordance with an embodiment of this specification.

FIG. 4 is a flowchart illustrating a method of performing uplink ranging in accordance with an embodiment of this specification.

Referring to FIG. 4, an MS receives control information, indicating an area where uplink ranging will be performed, from a BS in order to shift from idle mode to normal mode (or connected mode) (S410). Here, the MS may be a machine to machine (M2M or MTC) device which supports MTC.

The control information refers to a superframe in which the MS in idle mode performs the uplink ranging and information on the position of the frame in order to perform network reentry into the BS.

The control information may also be represented by uplink ranging area information or frame determination information. Furthermore, as will be described later, the control information may be transmitted through a MAC message or may be transmitted to the MS in the form of a header or through a map information element.

That is, the control information includes a first parameter indicative of the position of a superframe in which an MS in idle mode performs uplink ranging and a second parameter indicative of a frame interval where the MS performs uplink ranging in the superframe indicated by the first parameter.

Here, the first parameter M is a parameter indicating an access class, and the first parameter M means a value used by the MS in order to determine the superframe in which the uplink (UL) ranging is performed.

Furthermore, the value of the first parameter M is 0~3. For example, when the M value is '0', an MS determines a frame in which UL ranging will be performed (or transmitted) frame in a current superframe.

Furthermore, when the M value is '1', an MS determines a frame in which UL ranging will be performed in a frame next to a current superframe.

That is, the BS distributes MSs (e.g., M2M devices) on a superframe basis in order to send UL ranging in response to the first parameter (access class).

Here, the first parameter may be determined based on a superframe in which a paging message is transmitted in a paging interval of idle mode. That is, the first parameter value may be represented by an offset value between a superframe in which a paging message is transmitted and a superframe in which UL ranging is performed.

For example, when the M value is '0', a superframe in which uplink ranging is performed indicates a superframe in which a paging message is transmitted. When the M value is '1', a superframe in which uplink ranging is performed indicates a superframe next to a superframe in which a paging message is transmitted.

Furthermore, the second parameter N is a value used in order for an MS to determine a frame in which UL ranging is performed. The second parameter N indicates a frame interval within a superframe in which an MS performs uplink ranging.

Table 1 below is a table showing an example of the first parameter M and the second parameter N in accordance with an embodiment of this specification.

TABLE 1

| Syntax | Size (Bit) | Description |
| --- | --- | --- |
| M (Access Class) | 2 | Indicate the access class of an MS. A range of the access class is 0~3. A corresponding parameter indicates a superframe in which an MS performs UL ranging in an idle mode network reentry process. 0: indicates a current superframe in which a paging message has been received. 1: indicates an N + 1 superframe assuming that a superframe in which a paging message has been received is N. 2: indicates an N + 2 superframe assuming that a superframe in which a paging message has been received is N. 3: indicates an N + 3 superframe assuming that a superframe in which a paging message has been received is N. |
| N | 2 | Indicate a value used for a device to determine a frame for transmitting UL ranging. |

Next, the MS determines a superframe and a frame for performing uplink ranging based on the control information received from the BS, that is, the first parameter and the second parameter (S420).

First, the MS determines a superframe in which UL ranging will be transmitted based on the first parameter (M) value.

Next, the MS determines a frame for performing the uplink ranging through a modulo operation of an STID allocated by the BS and the second parameter value. That is, the MS determines a frame for transmitting the UL ranging based on a value obtained by the 'STID modulo N'.

Here, the STID refers to an STID allocated to an M2M device by a BS, that is, an M2M STID. The STID can be allocated by a BS through an initial network entry procedure with the BS.

For another example, the MS may determine a frame for the uplink ranging through a modulo operation (i.e., DID modulo N) of a deregistration identifier (DID), allocated through an idle mode shift procedure with the BS instead of the STID, and the second parameter.

Accordingly, the MS determines a superframe and a frame in the superframe for performing the uplink ranging based on the first parameter and the second parameter.

Next, the MS performs uplink ranging for network reentry into the BS through a frame that corresponds to the value of the 'STID modulo N' in a frame interval indicated by the second parameter, in a superframe indicated by the first parameter (S430).

A variety of embodiments in which the control information (i.e., the first parameter and the second parameter) is transmitted are described in detail with reference to FIGS. 5 to 9.

Figure 5:
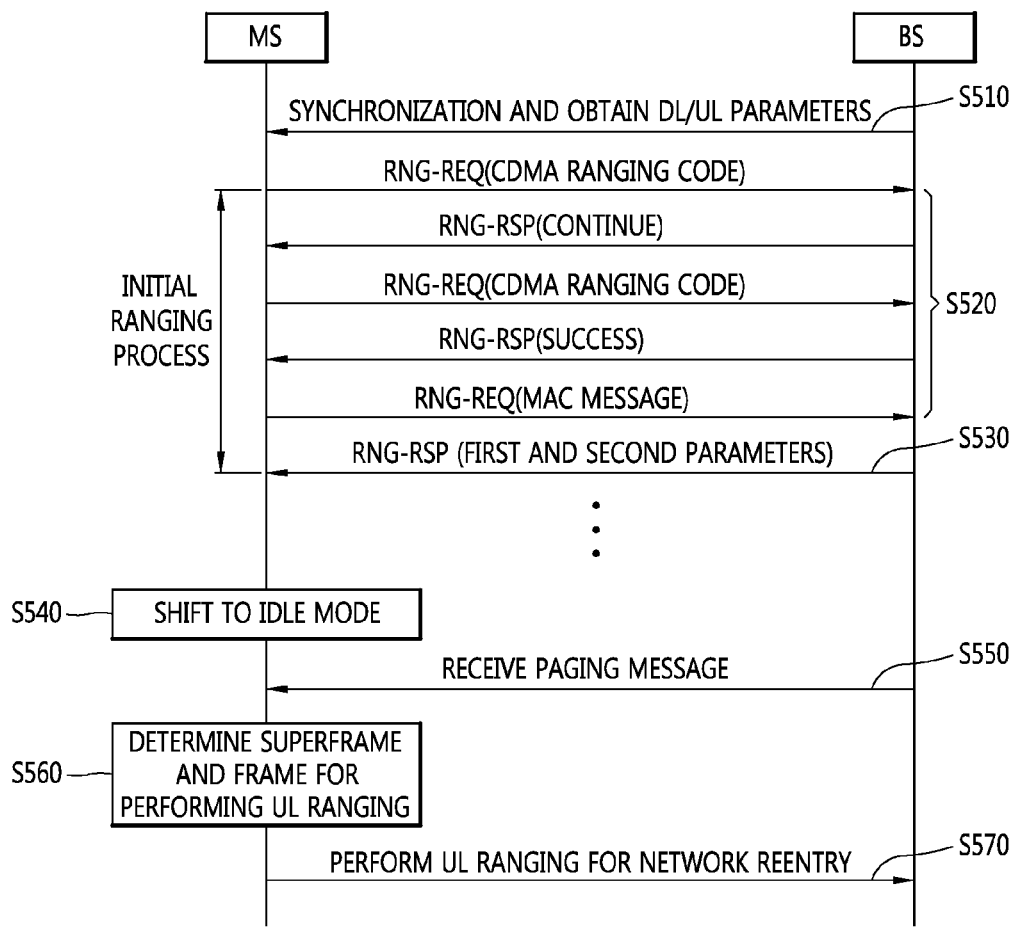
FIG. 5 is a flowchart illustrating a method in which control information is transmitted by a BS through initial ranging during an initial access procedure in accordance with an embodiment of this specification.

FIG. 5 is a flowchart illustrating a method in which control information is transmitted by a BS through initial ranging during an initial access procedure in accordance with an embodiment of this specification.

Steps S510 to S520 are the same as those of the steps S310 to S320 of FIG. 3, and thus a description of the same parts is omitted and only differences are described in detail below.

An MS receives control information (or frame determination information), that is, the first and the second parameters, from the BS through a ranging procedure during an initial ranging process. That is, the MS receives the control information through a ranging response (RNG-RSP) message received from the BS during the initial ranging process (S530).

Next, the MS shifts to idle mode (S540) and stores the received control information until it receives a paging message from the BS. That is, although the MS shifts to idle mode, the MS maintains the received control information without discarding the received control information.

Next, the MS in idle mode receives a paging message from the BS in a paging interval (S550). In this case, the MS determines a frame in which uplink ranging will be performed for network reentry based on the control information (i.e., the first parameter and the second parameter) and an STID (S560).

Next, the MS performs the uplink ranging for network reentry into the BS through the determined frame (S570).

Figure 6:
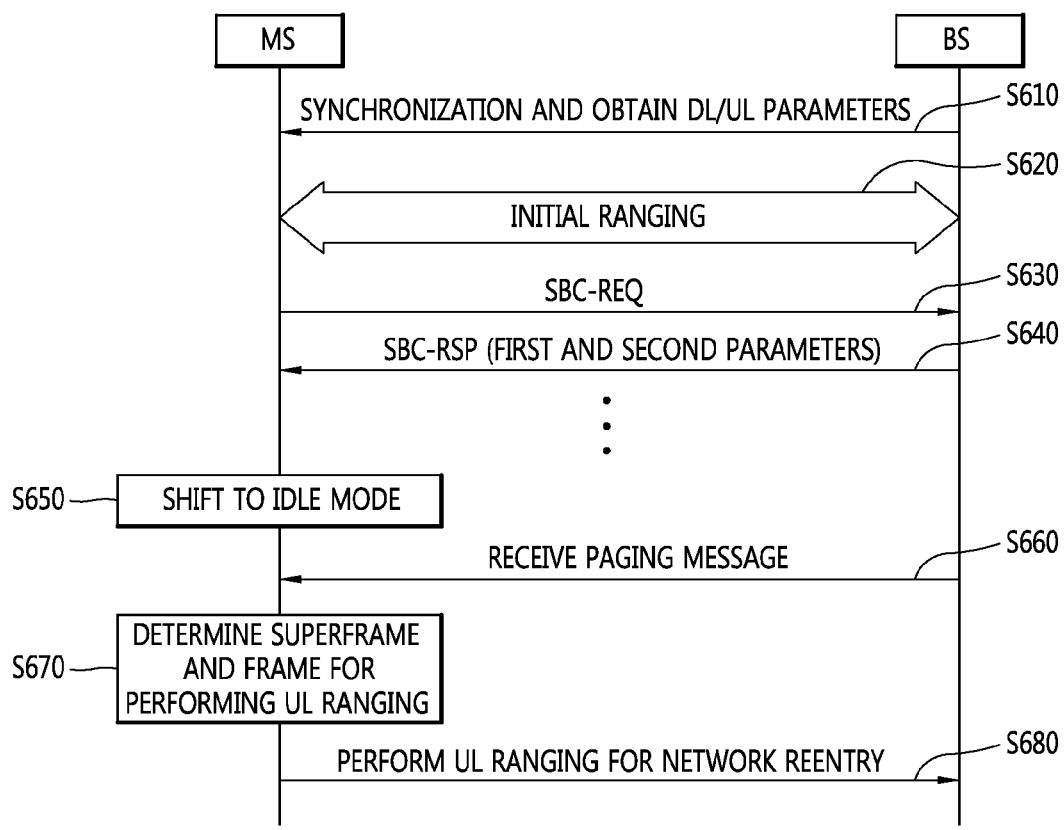
FIG. 6 is a flowchart illustrating a method in which control information is transmitted by a BS through a subscriber station basic capability negotiation procedure during an initial access procedure in accordance with another embodiment of this specification.

FIG. 6 is a flowchart illustrating a method in which control information is transmitted by a BS through a subscriber station basic capability negotiation procedure during an initial access procedure in accordance with another embodiment of this specification.

Steps S610 to S630 are the same as those of the steps S310 to S340 of FIG. 3, and thus a description of the same parts is omitted and only differences are described in detail below.

Referring to FIG. 6, after finishing an initial ranging process with the BS, an MS performs a subscriber station basic capability negotiation process.

The basic capability negotiation process is a process in which the MS sends a subscriber station basic capability request (SBC-REQ) message to the BS and receives a subscriber station basic capability response (SBC-RSP) message from the BS.

Here, the MS receives control information, that is, the first and the second parameters, from the BS through the basic capability negotiation process with the BS. That is, the MS receives the control information through the SBC-RSP message that is transmitted by the BS during the basic capability negotiation process (S640).

Next, like in the steps S540 to S570 of FIG. 5, the MS determines a superframe and a frame for performing uplink ranging based on the control information and an STID and performs the uplink ranging to the BS through the frame of the determined superframe (S650~S680).

Figure 7:
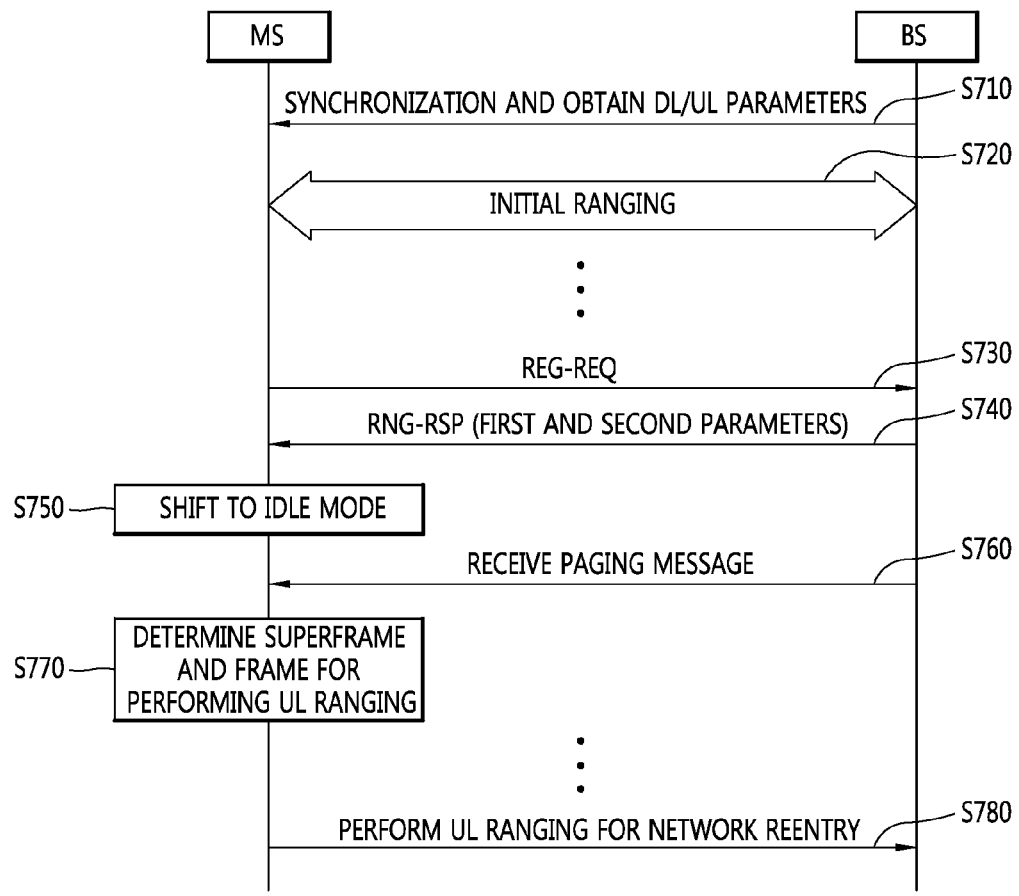
FIG. 7 is a flowchart illustrating a method in which control information is transmitted by a BS through the registration procedure of an initial access procedure in accordance with yet another embodiment of this specification.

FIG. 7 is a flowchart illustrating a method in which control information is transmitted by a BS through the registration procedure of an initial access procedure in accordance with yet another embodiment of this specification.

Steps S710 to S730 are the same as those of the steps S310 to S370 of FIG. 3, and thus a description of the same parts is omitted and only differences are described in detail below.

An MS receives control information, that is, the first and the second parameters, from the BS through a registration procedure during an initial ranging process. That is, the MS receives the control information through a REG-RSP message transmitted by the BS during the initial ranging process (S740).

Next, like in the steps S540 to S570 of FIG. 5, the MS determines a superframe and a frame for performing uplink ranging based on the control information and an STID and performs the uplink ranging for the BS through the frame of the determined superframe (S750~S780).

Figure 8:
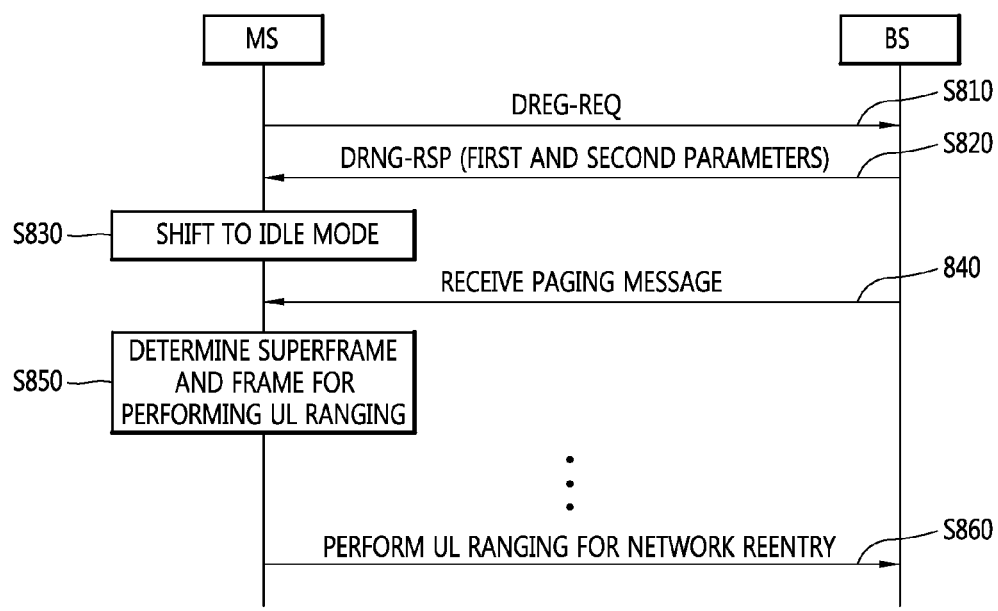
FIG. 8 is a flowchart illustrating a method in which control information is transmitted by a BS through an idle mode shift process, that is, a deregistration procedure with a BS, in accordance with yet another embodiment of this specification.

FIG. 8 is a flowchart illustrating a method in which control information is transmitted by a BS through an idle mode shift process, that is, a deregistration procedure with a BS, in accordance with yet another embodiment of this specification.

Steps S830 to S860 are the same as those of the steps S540 to S570 of FIG. 5, and thus a description of the same parts is omitted and only differences are described in detail below.

An MS receives control information, that is, the first and the second parameters, from the BS through a process of shifting to idle mode, that is, a deregistration procedure with the BS (S810 and S820). That is, when shifting to idle mode, the MS receives the control information through a DRNG-RSP message transmitted by the BS (S820).

Figure 9:
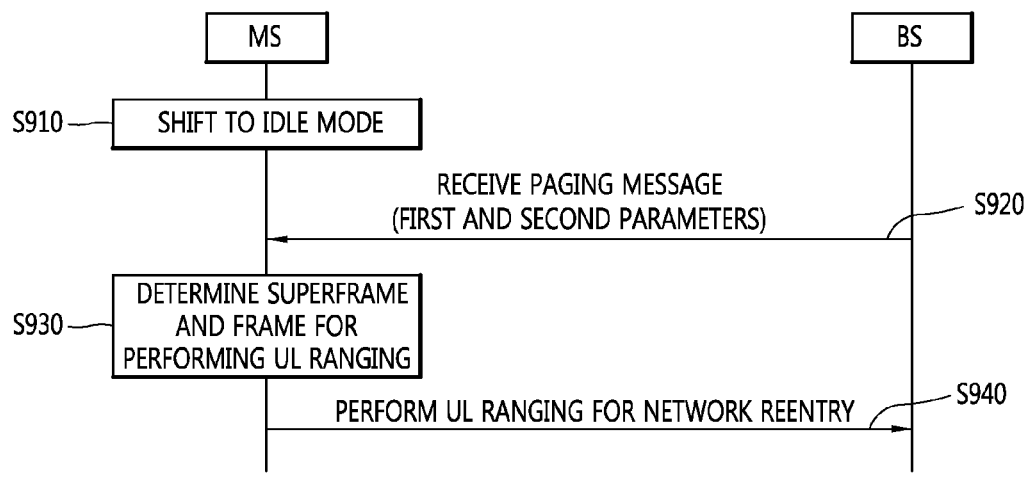
FIG. 9 is a flowchart illustrating a method in which control information is transmitted by a BS through a paging message in the paging interval of idle mode in accordance with yet another embodiment of this specification.

FIG. 9 is a flowchart illustrating a method in which control information is transmitted by a BS through a paging message in a paging interval of idle mode in accordance with yet another embodiment of this specification.

Steps S930 to S940 are the same as those of the steps S560 to S570 of FIG. 5, and thus a description of the same parts is omitted and only differences are described in detail below.

Referring to FIG. 9, after shifting to idle mode (S910), an MS receives a paging message from the BS in a paging interval (S920). Here, the paging message includes control information (or frame determination information), that is, the first and the second parameters.

Methods of performing uplink ranging in a frame determined by the control information M and N and an STID in accordance with embodiments of this specification are described with reference to FIGS. 10 to 13.

Figure 10:
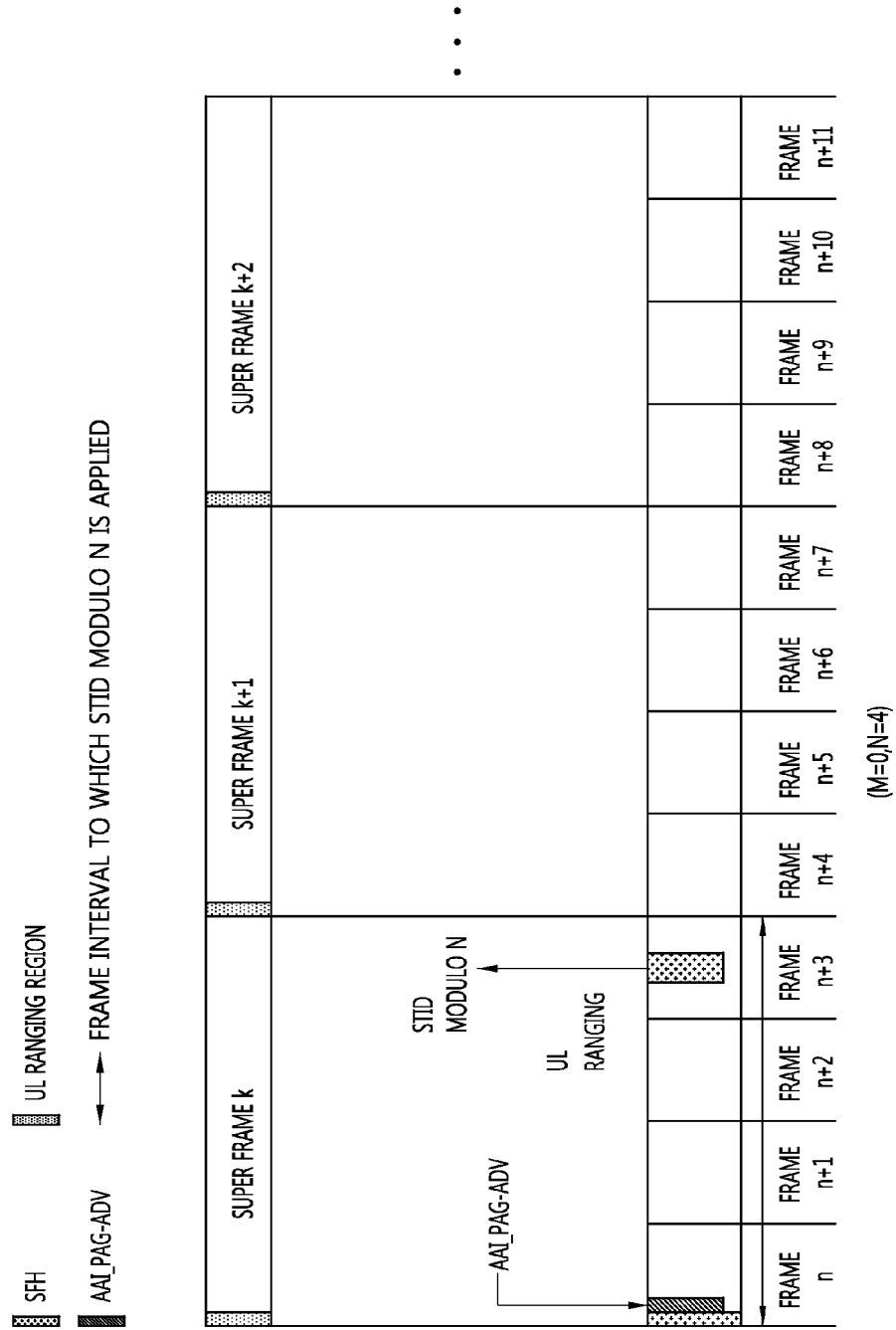
FIG. 10 is a diagram showing a method of performing uplink ranging in a frame determined through control information M and N and an STID in accordance with an embodiment of this specification.

FIG. 10 is a diagram showing a method of performing uplink ranging in a frame determined through control information M and N and an STID in accordance with an embodiment of this specification.

As shown in FIG. 10, it is assumed that the first parameter M=0 and the second parameter N=4.

Referring to FIG. 10, an MS receives a paging message from a BS in the first frame (i.e., a frame n) of a superframe k.

Here, since M=0, the MS performs UL ranging for network reentry in a superframe k in which the paging message has been received.

Furthermore, since N=4, the MS sends UL ranging to the BS within four frame intervals (i.e., the frame~a frame n+3 of FIG. 10) from the first frame of the superframe k in which the paging message has been received.

Here, the MS determines a frame in which UL ranging for the BS will be performed based on a value obtained through an 'STID modulo 4' during the four frame intervals. That is, FIG. 10 shows a case where a remainder obtained through the 'STID modulo 4' is '3'. It can be seen that a frame for UL ranging is a fourth frame, that is, the frame n+3 from the frame in which the paging message has been received.

Accordingly, the MS performs uplink ranging for network reentry into the BS through the frame n+3.

In addition, if the remainder obtained through the 'STID modulo 4' is

1) '0', the MS performs the UL ranging for the BS in the first ($1^{st}$) frame (i.e., the frame in which the paging message has been received: the frame n) of the superframe k in FIG. 10.

2) '1', the MS performs the UL ranging for the BS in the second ($2^{nd}$) frame (i.e., the frame in which the paging message has been received +1: a frame n+1) of the superframe k in FIG. 10.

3) '2', the MS performs the UL ranging for the BS in the third (3rd) frame (i.e., the frame in which the paging message has been received +2: a frame n+2) of the superframe k in FIG. 10.

4) '3', the MS performs the UL ranging for the BS in the fourth ($4^{th}$) frame (i.e., the frame in which the paging message has been received +3: a frame n+3) of the superframe k in FIG. 10.

Figure 11:
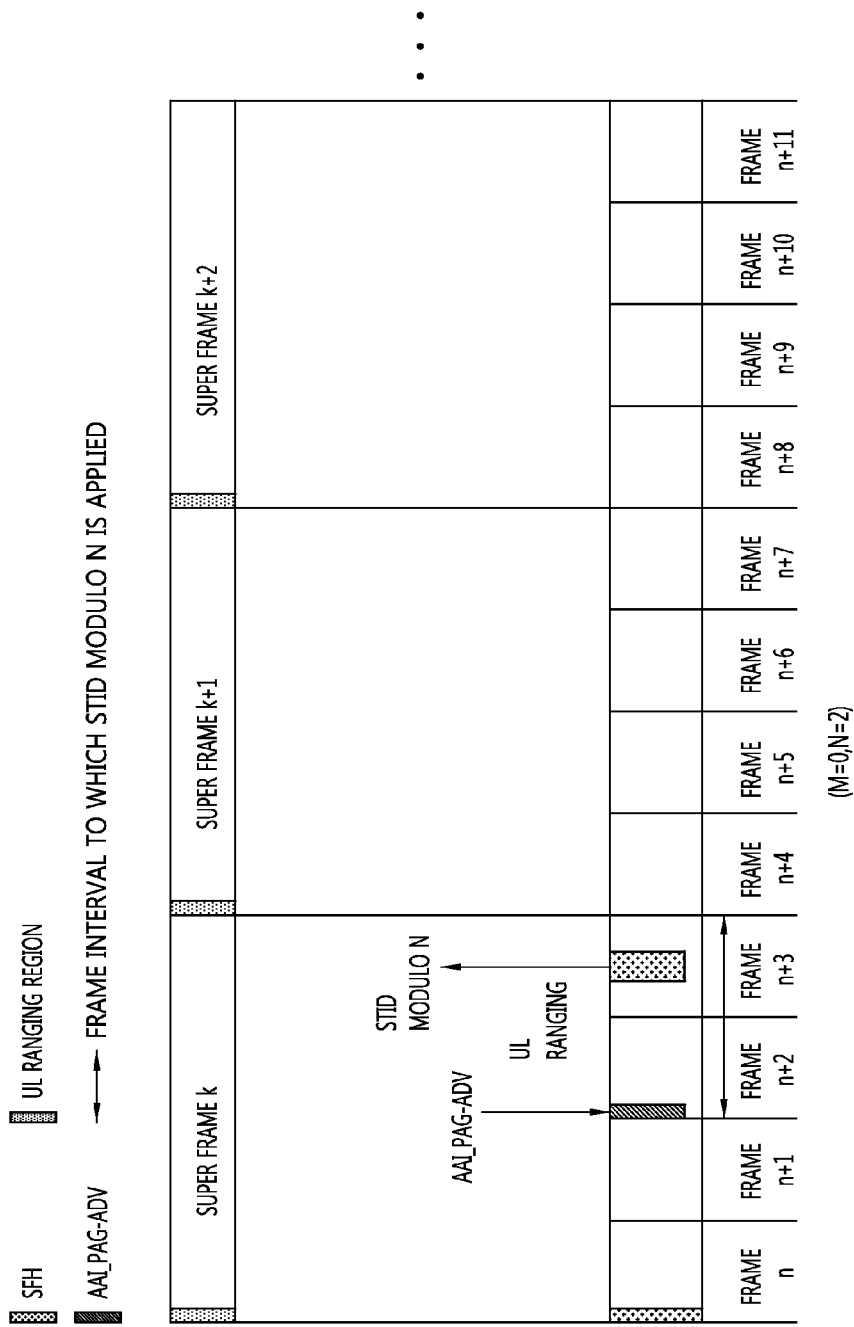
FIG. 11 is a diagram showing a method of performing uplink ranging in a frame determined through control information M and N and an STID in accordance with yet another embodiment of this specification.

FIG. 11 is a diagram showing a method of performing uplink ranging in a frame determined through the control information M and N and an STID in accordance with yet another embodiment of this specification.

As shown in FIG. 11, it is assumed that the first parameter M=0 and the second parameter N=2.

Referring to FIG. 11, an MS receives a paging message in the third frame (i.e., a frame n+2) of a superframe k.

Here, since M=0, the MS performs UL ranging for a BS in the superframe k in which the paging message has been received.

Furthermore, since N=2, the MS sends UL ranging to the BS within 2 frame intervals (i.e., the frame n+2~a frame n+3 of FIG. 11) from the third frame (i.e., the frame n+2) of the superframe k in which the paging message has been received.

Here, the MS determines a frame in which UL ranging will be performed based on a value obtained through an 'STID modulo 2' during the two frame intervals. FIG. 11 shows a case where a remainder obtained through the 'STID modulo 2' is '1'. It can be seen that a frame for UL ranging is a second frame, that is, the frame n+3, from the frame in which the paging message has been received.

That is, the MS performs the uplink ranging for network reentry into the BS through the frame n+3.

In addition, if the remainder obtained through the 'STID modulo 2' is '0', the MS performs the UL ranging for the BS in the first ($1^{st}$) frame (i.e., the frame in which the paging message has been received: the frame n+2) of the superframe k in FIG. 11.

Figure 12:
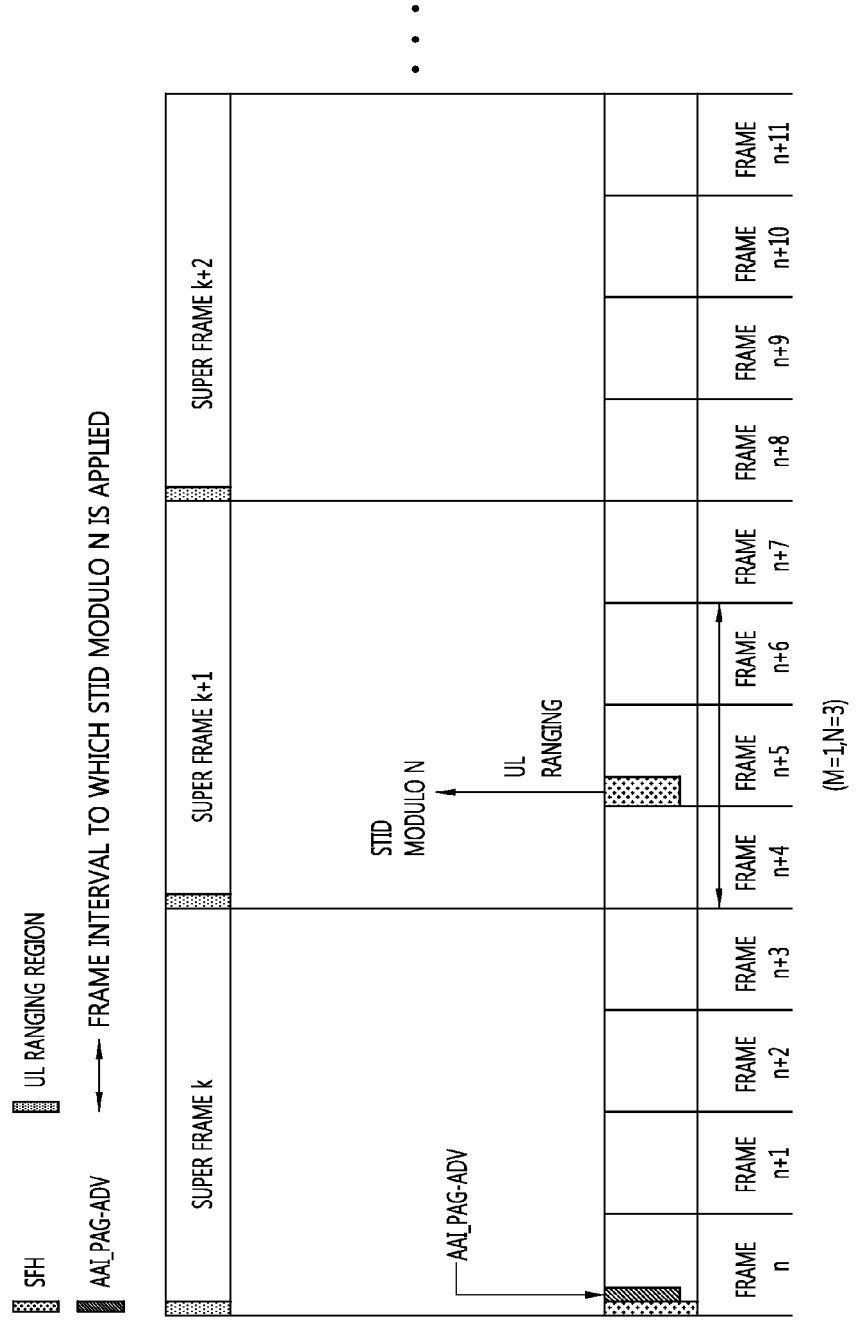
FIG. 12 is a diagram showing a method of performing uplink ranging in a frame determined through control information M and N and an STID in accordance with yet another embodiment of this specification.

FIG. 12 is a diagram showing a method of performing uplink ranging in a frame determined through the control information M and N and an STID in accordance with yet another embodiment of this specification.

As shown in FIG. 12, it is assumed that the first parameter M=1 and the second parameter N=3.

Referring to FIG. 12, an MS receives a paging message from a BS in the first frame (i.e., a frame n) of a superframe k.

Here, since M=1, the MS performs UL ranging for network reentry in the superframe (i.e., a superframe k+1) of a superframe in which the paging message has been received (i.e., the superframe k)+1.

Furthermore, since N=3, the MS sends the UL ranging to the BS within 3 frame intervals (i.e., a frame n+4~a frame n+6 of FIG. 12) from the first frame of the superframe k+1.

Here, the MS determines a frame in which the UL ranging for the BS will be performed based on a value obtained through an 'STID modulo 3' during the 3 frame intervals. FIG. 12 shows a case where a remainder obtained through the 'STID modulo 3' is '1'. It can be seen that the frame for the UL ranging is the second frame of the superframe k+1, that is, a frame n+5.

That is, the MS performs the uplink ranging for network reentry into the BS through the frame 5+3.

In addition, if the remainder obtained through the 'STID modulo 3' is

1) '0', the MS performs the UL ranging for the BS in the first ($1^{st}$) frame (i.e., a frame n+4) of the superframe k+1 in FIG. 12.

2) '2', the MS performs the UL ranging for the BS in the third ($3^{rd}$) frame (i.e., a frame n+6) of the superframe k+1 in FIG. 12.

Figure 13:
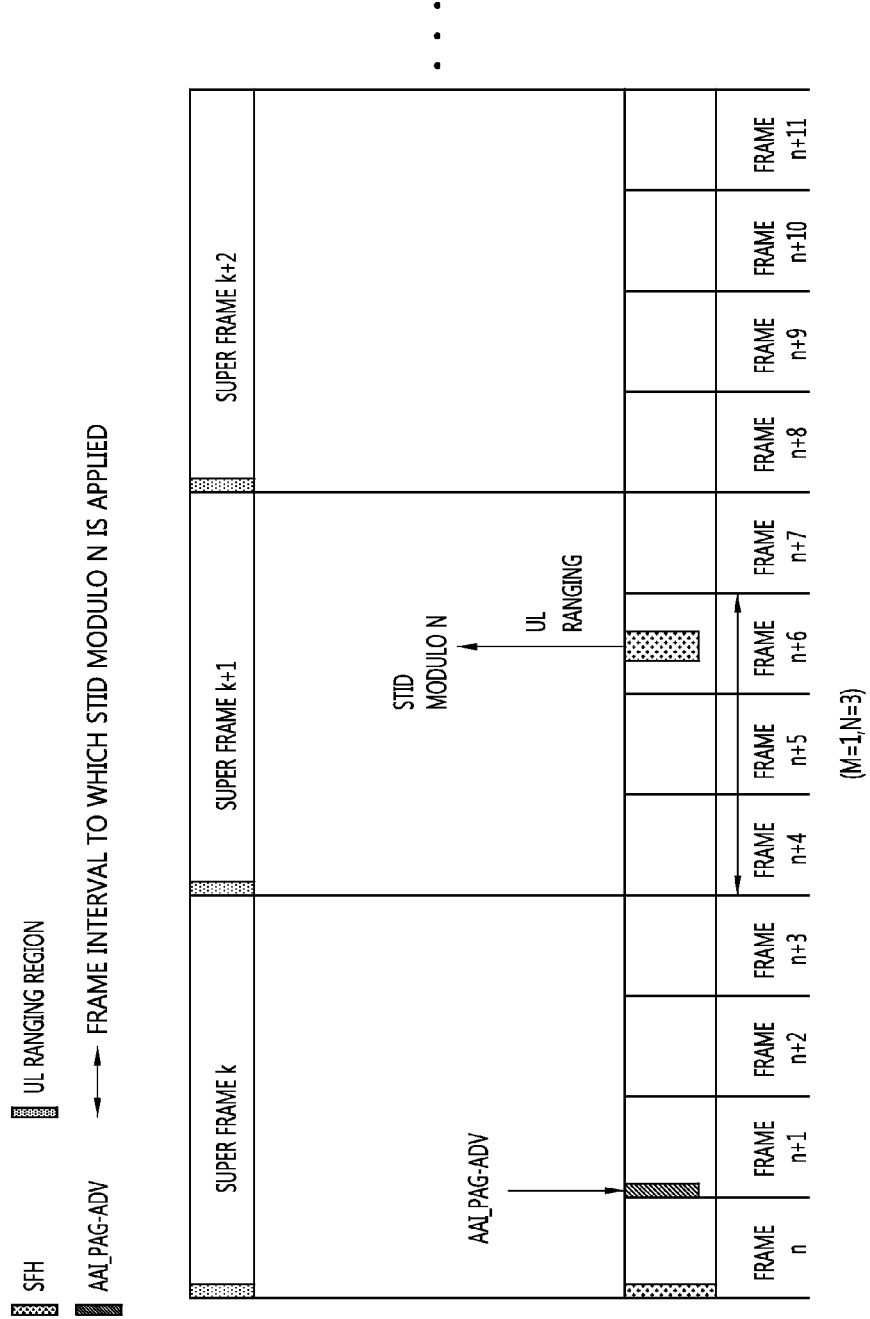
FIG. 13 is a diagram showing a method of performing uplink ranging in a frame determined through control information M and N and an STID in accordance with yet another embodiment of this specification.

FIG. 13 is a diagram showing a method of performing uplink ranging in a frame determined through control information M and N and an STID in accordance with yet another embodiment of this specification.

As shown in FIG. 13, it is assumed that the first parameter M=1 and the second parameter N=3.

Referring to FIG. 13, an MS receives a paging message from a BS in the second frame (i.e., a frame n+1) of a superframe (i.e., a superframe k).

Here, since M=1, the MS performs UL ranging for network reentry in the superframe (i.e., a superframe k+1) of the superframe (i.e., a superframe k) in which the paging message has been received +1.

Furthermore, since N=3, the MS sends the UL ranging to the BS within 3 frame intervals (i.e., a frame n+4~a frame n+6 of FIG. 12) from the first frame of the superframe k+1.

Here, the MS determines a frame in which the UL ranging for the BS will be performed based on a value obtained through an 'STID modulo 3' during the 3 frame intervals. FIG. 13 shows a case where a remainder obtained through the 'STID modulo 3' is '2'. It can be seen that the frame for the UL ranging is the third frame of the superframe k+1, that is, a frame n+6.

That is, the MS performs the uplink ranging for network reentry into the BS through a frame 5+6.

In addition, if the remainder obtained through the 'STID modulo 3' is

1) '0', the MS performs the UL ranging for the BS in the first ($1^{st}$) frame (i.e., a frame n+4) of the superframe k+1 in FIG. 12.

2) '1', the MS performs the UL ranging in the second ($2^{nd}$) frame (i.e., a frame n+5) of the superframe k+1 in FIG. 12.

What is claimed is:

1. A method in which a mobile station in idle mode performs network reentry in a wireless access system, the method comprising:
   transmitting a deregistration request (DREG-REQ) message for transitioning from a normal mode to an idle mode;
   receiving a deregistration response (DREG-RSP) message including control information comprising a first parameter and a second parameter for determining a frame in which uplink ranging is performed, from a base station;
   transitioning, in response to the reception of the DREG-RSP message, from the normal mode to the idle mode;
   receiving, in a paging interval of the idle mode, a paging message from the base station; and
   performing, in response to the reception of the paging message, the uplink ranging for network reentry with the base station based on the first and second parameters in the control information thereby transitioning from the idle mode to the normal mode,
   wherein the first parameter indicates a position of a superframe in which the uplink ranging is performed, and the second parameter indicates a frame interval in which the uplink ranging is performed in the superframe indicated by the first parameter.

2. The method of claim 1, wherein performing the uplink ranging comprises:
   determining any one frame in the frame interval, indicated by the second parameter, as a frame in which the uplink ranging is performed; and
   transmitting an uplink ranging sequence to the base station through the determined frame.

3. The method of claim 2, further comprising receiving a station identifier (STID) allocated by the base station.

4. The method of claim 3, wherein the any one frame is determined through a modulo operation of the STID and the second parameter.

5. The method of claim 3, wherein the STID is an STID allocated to a machine to machine (M2M) device.

6. The method of claim 3, wherein the STID is allocated through an initial access procedure with the base station.

7. The method of claim 3, wherein the STID is a deregistration identifier (DID).

8. The method of claim 1, wherein the first parameter is an offset value between a superframe in which the paging message is received and the superframe in which the uplink ranging is performed.

9. The method of claim 1, wherein the control information is further received through an initial network entry process with the base station.

10. The method of claim 9, wherein the further received control information is included in a ranging response (RNG-RSP) message, a subscriber station basic capability response (SBC-RSP) message, or a registration response (REG-RSP) message and received.

11. The method of claim 1, wherein the control information further is included in the received paging message.

12. A mobile station for performing network reentry in idle mode in a wireless access system, comprising:
   a radio frequency (RF) unit for transmitting and receiving radio signals; and
   a control unit connected to the RF unit is configured to perform steps of:
   transmitting a deregistration request (DREG-REQ) message for transitioning from a normal mode to an idle mode;
   receiving a deregistration response (DREG-RSP) message including control information, comprising a first parameter and a second parameter for determining a frame in which uplink ranging is performed, from a base station;
   transitioning, in response to the reception of the DREG-RSP message, from the normal mode to the idle mode;
   receiving, in a paging interval of the idle mode, a paging message from the base station:
   performing, in response to the reception of the paging message, the uplink ranging for network reentry with the base station based on the first and second parameters in the control information thereby transitioning from the idle mode to the normal mode,
   wherein the first parameter indicates a position of a superframe in which the uplink ranging is performed, and the second parameter indicates a frame interval in which the uplink ranging is performed in the superframe indicated by the first parameter.

13. The mobile station of claim 12, wherein the first parameter is an offset value between a superframe in which the paging message is received and the superframe in which the uplink ranging is performed.

14. The mobile station of claim 12, wherein the control unit determines any one frame in the frame interval, indicated by the second parameter, as a frame in which the uplink ranging is performed and performs control so that the uplink ranging for the base station is performed through the determined frame.

15. The mobile station of claim 14, wherein the control unit performs control so that a station identifier (STID) allocated by the base station is received.

16. The mobile station of claim 15, wherein the control unit performs control so that the any one frame is determined by performing a modulo operation of the STID and the second parameter.

17. The mobile station of claim 15, wherein the STID is an STID allocated to a machine to machine (M2M) device.

18. The mobile station of claim 15, wherein the STID is allocated through an initial access procedure with the base station.

19. The mobile station of claim 15, wherein the STID is a deregistration identifier (DID).

20. The mobile station of claim 12, wherein the control unit controls the RF unit so that the RF unit further receives the control information through an initial network entry process with the base station.

21. The mobile station of claim 20, wherein the control information is further included in a ranging response (RNG-RSP) message, a subscriber station basic capability response (SBC-RSP) message, or a registration response (REG-RSP) message.

22. The mobile station of claim 12, wherein the control information is further included in the received paging message.

* * * * *